United States Patent Office 2,707,095
Patented Apr. 26, 1955

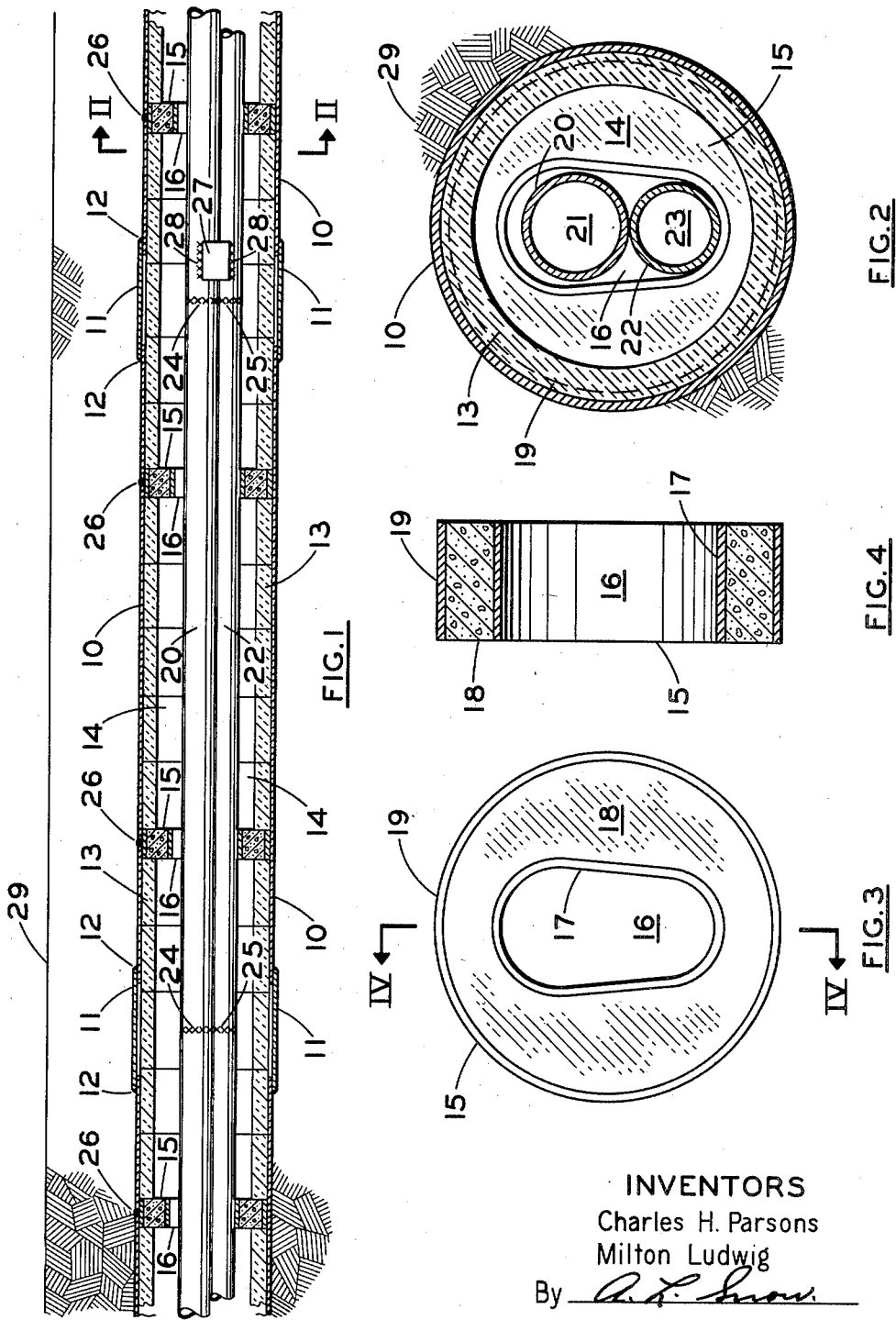

2,707,095

UNDERGROUND HEAT EXCHANGER

Charles H. Parsons, San Carlos, and Milton Ludwig, Berkeley, Calif., assignors, by mesne assignments, to The R-W Mfg. Co., a corporation of Ohio Application May 8, 1950, Serial No. 160,794

7 Claims. (Cl. 257—241)

This invention relates to heat exchangers, and particularly those which may extend underground for long distances to convey fluids whose temperatures are to be maintained above a predetermined minimum value.

In the transportation of liquids which are exceedingly viscous at low temperatures, it has been the practice heretofore to heat the pipe or conduit through which the liquids are to be passed by means of a second conduit which may either be inside of the first or placed alongside of it and then the two covered with suitable insulation secured around both pipes to prevent heat loss. Where such lines are laid above ground, this procedure is quite satisfactory, but where they are to be submerged underwater or buried in the earth, it becomes necessary to provide a rigid casing for mechanical protection for the insulation surrounding the pipes and also sealed securely to prevent water from reaching the insulation, thereby reducing its efficiency.

This problem is somewhat different from that encountered in underground piping systems where separately insulated steam lines, for example, are encased in sectional tile conduits or even in metal jackets. In those constructions, the outer casing serves merely as a mechanical protection against earth pressure for the insulation and is usually provided with longitudinal drainage passages so that condensation and the like can be drained either continuously along the length of the pipe or at frequent intervals into a layer of gravel or special tile drains on which the outer casing is supported. Also, the problem of providing for expansion and contraction of the fluid-carrying pipe has been made by flexible bellows at frequent intervals, often as closely spaced as 20 feet.

This invention comprehends broadly the provision in an underground heat exchanger of a plurality of bare conduits, one adapted to carry the liquid to be heated from a low temperature or whose temperature is to be maintained, and the other adapted to carry a heating fluid, for example steam, both encased in an outer rigid metal casing with an insulating lining in the casing of such internal diameter that the bare fluid-conducting pipes are enclosed in an air space in which heat is exchanged or transferred from one to the other. To maintain the several conduits and the outer casing in exact alignment, a plurality of apertured blocks are provided along the length of the heat exchanger to maintain the inner pipes straight and closely adjacent to each other and also to space them from the insulating lining of the outer casing, so that axial motion of the pipe within the blocks will not damage the relatively fragile insulation. A further important factor in this invention is the omission of all vents or drains from the outer casing, which is hermetically sealed throughout its length.

It is a primary object of this invention to provide an underground heat exchanger in which the outer casing and the insulating lining as well as the spacer blocks may be assembled in sections and taken to the place of installation, after which the inner pipes or conduits may be installed.

Another object is to provide a system of this kind in which the inner conduits are maintained in such exact and straight alignment by suitable supports longitudinally spaced within the rigid outer casing that the previous practice of closely spaced flexible bellows and the like to take care of expansion and contraction due to temperature changes can be avoided unless temperature variations are excessive. In the preferred construction longitudinal forces due to tension are readily absorbed in the inner conduits without distortion. Compression forces due to restraint of expansion of the inner conduit with temperature changes are absorbed due to these conduits acting as columns with very short effective lengths so that transverse deflection or buckling is effectively prevented.

Another object is to provide a completely enclosed underground heat exchanger which will enable initial heating of a line when viscous liquid flow through it is started, or to raise its temperature after cooling or to maintain a predetermined minimum temperature in one liquid-carrying pipeline by means of a heating fluid passing through an adjacent and entirely separate pipeline, both enclosed within an internally insulated outer casing, the entire system being hermetically sealed at the time of its installation.

These and other objects and advantages will be further apparent from the following description and from the attached drawing which forms a part of this specification and illustrates a preferred embodiment of the invention.

In the drawing,

Fig. 1 is a longitudinal, sectional view of a completed portion of an underground heat exchanger.

Fig. 2 is a vertical, sectional view on line II—II of the heat exchanger shown in Fig. 1.

Fig. 3 is an end elevational view of an apertured spacer block useful in this system.

Fig. 4 is a vertical sectional view of the apertured spacer block on line IV—IV of Fig. 3.

By referring to the drawing, and particularly to Fig. 1, reference numeral 10 represents the outer rigid metal casing sections which are spaced apart during installation and finally covered by the shorter cover sections 11 which are welded thereto as at 12. Inside of casing 10 are a plurality of form-sustaining rings 13 of insulating material which fit closely within the casing and leave a cylindrical air space 14. Rings 13 may be made up of any suitable insulating material which is form-sustaining, for example magnesia, asbestos or combinations of these with suitable refractory binders. Prior to installation, this insulation and all of the other parts to be installed within casing 10 should be maintained in as dry condition as feasible to prevent subsequent moisture condensation or accumulation after the entire system is hermetically sealed. At suitable longitudinal intervals in casing 10, spacer blocks 15 (Figs. 3 and 4) are placed and are apertured as at 16 to form elongated slots within which the inner conduits or pipes are aligned.

Spacer blocks 15 may be made of any suitable heat-resistant and mechanically rigid material, for example light weight concrete with an elongated sleeve 17 supported in the concrete body 18 of the block. In order to separate the conduits which are supported in sleeve 17 so that the circumferential field welds to be described below can be made, the longest dimension of sleeve 17 may be somewhat greater than the combined outer diameter of both of the conduits which will be installed therein. Desirably, but not necessarily, block 15 is provided with an outer metal shell 19 for a purpose which will be described in more detail below.

Sections comprising outer casing 10, insulating rings 13 and spacer blocks 15 may be assembled and transported to the place of use after which they may be slid endwise over the previously laid inner pipes 20 and 22 or the latter may be slid into the sections before installation.

In this example, a first inner conduit 20 is adapted to convey a liquid 21 which has such temperature-viscosity characteristics that it must be continuously heated throughout its length in order to prevent excessive pressure drop or even complete stoppage of liquid flow in conduit 20. A second inner conduit 22 is adapted to be aligned either beneath or above conduit 20 by the apertured spacer blocks mentioned above and to convey a heating fluid 23, for example steam. Transfer of heat from conduit 22 to conduit 20 is primarily by radiation and convection to the air space 14 formed inside of the insulating rings 13. This is a feature which appears to be entirely absent from the previous practice involving underground steam systems and the like.

Adjacent lengths of conduits 20 and 22 are welded together in the field as at 24 and 25 to form a continuous system, after which additional insulating rings are placed over the welds and the covered sections 11 are finally welded to form a continuous hermetically sealed system with the outer casing 10.

Desirably, in order to maintain the apertured spacer blocks 15 in such a position in casing 10 that the liquid-conveying conduit 20 will be maintained in predetermined and usually vertical alignment with the heating fluid conduit 22, a plug weld 26 is formed connecting the outer shell 19 of each spacer block 15 with the casing 10. Particularly where the outer shell 10, insulating rings 13 and spacer blocks 15 are fabricated as a sub-assembly and transported to the field without having the inner conduits 20 and 22 installed therein, such a provision as just described is very desirable.

One of the particular advantages of this invention is the rigidity of the entire system after assembly which makes unnecessary the installation of closely spaced expansion joints or flexible bellows as has previously been the practice in the underground conduit art. To supplement the inherent rigidity of the system described, it may be desirable to secure together conduits 20 and 22 at intervals along the system by means of metal plates 27 which are welded as at 28 on each side of the conduits.

Any type of external protection against corrosion that may be desired can be applied to outer casing 10, either before the latter is placed in its trench in the earth 29 or after the entire system is welded and before it is lowered into the trench. Such features form no part of this invention, and they are too well known to need description in this specification.

In conclusion, it will be apparent from the foregoing that a readily assembled arrangement has been described for constructing an improved form of underground heat exchanger in which a rigid metal outer casing, lined with insulation, is provided with means for supporting the liquid conveying conduit and a heating fluid conduit within the cylindrical air space formed in the insulation, with means at longitudinally spaced intervals for maintaining the outer casing and the inner conduits rigidly in alignment so that stresses due to expansion and contraction can be absorbed in those structures, which will preclude the necessity for the frequently spaced expansion joints or bellows used in underground piping systems generally.

Although a specific embodiment has been illustrated and described, it is obvious that numerous changes could be made without departing from the invention and all such changes that fall within the scope of the appended claims are intended to be embraced thereby.

We claim:

1. A conduit system comprising an outer tubular metal casing, a tubular heat-insulating lining closely fitting the interior of the casing comprising longitudinal sections arranged in the casing in end-to-end relation, spaced apart heat-insulating supports supported by the casing and extending into the space within the lining and between adjacent sections thereof, two pipes carried by the heat-insulating supports and both spaced from the heat-insulating lining, the pipes being in direct heat-interchanging contact with each other.

2. A conduit system comprising an outer metallic tubular casing hermetically sealed throughout its length, a plurality of spaced heat-insulating supporting members secured to the interior of said casing, each providing an aperture having a metallic liner, a lining of sectional tubular self-supporting heat-insulating material extending throughout the casing between said supports and with them defining a substantial air cavity within the casing whereby heat may be transferred between two pipes in the casing by radiation and convection, two pipes extending lengthwise through the casing and spaced from the liner, the pipes being in heat-conducting contact with each other, one of said pipes carrying a fluid to be heated, the other of said pipes carrying a heating fluid.

3. A conduit system comprising an outer metallic tubular casing hermetically sealed throughout its length, a plurality of spaced heat-insulating supporting members secured to the interior of said casing, each provided with an aperture having a metallic liner, a lining of tubular self-supporting heat-insulating material extending throughout the casing between said supports and with them defining a substantial cavity within the casing, two pipes extending lengthwise through the casing and spaced from the liner, the pipes being in heat-conducting contact with each other.

4. A conduit comprising a tubular metal casing hermetically sealed throughout its length, a plurality of supporting blocks spaced throughout the casing each comprising a centrally-apertured block of heat-insulating material surrounded by a metal ring secured to the inner wall of the casing, the aperture being lined with a metallic bearing member, self-supporting tubular sections of heat-insulating material closely fitting the interior of the casing and extending throughout the spaces between the supporting blocks, and two pipes passing through the apertures in the supporting blocks.

5. A conduit comprising a tubular metal casing hermetically sealed throughout its length, a plurality of supporting blocks spaced throughout the casing each comprising a centrally apertured block of heat-insulating material surrounded by a metal ring secured to the inner wall of the casing and the aperture being lined with a metallic bearing member, self-supporting tubular sections of heat-insulating material closely fitting the interior of the casing and extending throughout the spaces between the supporting blocks, and two pipes passing through the apertures in the supporting blocks, and spaced metallic plates welded to both pipes intermediate some of the supporting blocks.

6. A conduit system comprising an outer tubular metal casing, a form sustaining tubular heat-insulating lining closely fitting the interior of the casing and comprising sections arranged in end-to-end relation, spaced apart heat-insulating supports supported by the casing and extending into the space within the lining between certain of said lining sections, two pipes carried by the heat-insulating supports and both spaced from the heat-insulating lining, said pipes being in heat interchanging contact with each other, said supports each having an elongated opening for receiving and positioning said pipes in contact with each other, said supports having circumferential welded contact with the inner wall of said tubular metal casing.

7. A conduit system comprising an outer metallic tubular casing hermetically sealed throughout its length, a plurality of spaced heat-insulating supporting members secured to the interior of said casing, each provided with an aperture having a metallic liner, a lining of tubular self-supporting heat-insulating material extending throughout the casing between said supports and with them defining a substantial cavity within the casing, the largest diameter of said aperture being less than the diameter of the cavity within the conduit lining, two pipes extending lengthwise through the casing and spaced from the liner, the pipes being in heat-conducting contact with each other.

References Cited in the file of this patent

UNITED STATES PATENTS

| 384,860 | Meehan | June 19, 1888 |
| 1,317,495 | Hessel | Sept. 30, 1919 |
| 2,076,922 | Simard | Apr. 13, 1937 |
| 2,297,165 | Ringel | Sept. 29, 1942 |
| 2,464,363 | Wyatt | Mar. 15, 1949 |
| 2,485,610 | Kromer | Oct. 21, 1949 |

FOREIGN PATENTS

| 438,317 | Germany | Nov. 1, 1921 |